2,689,336

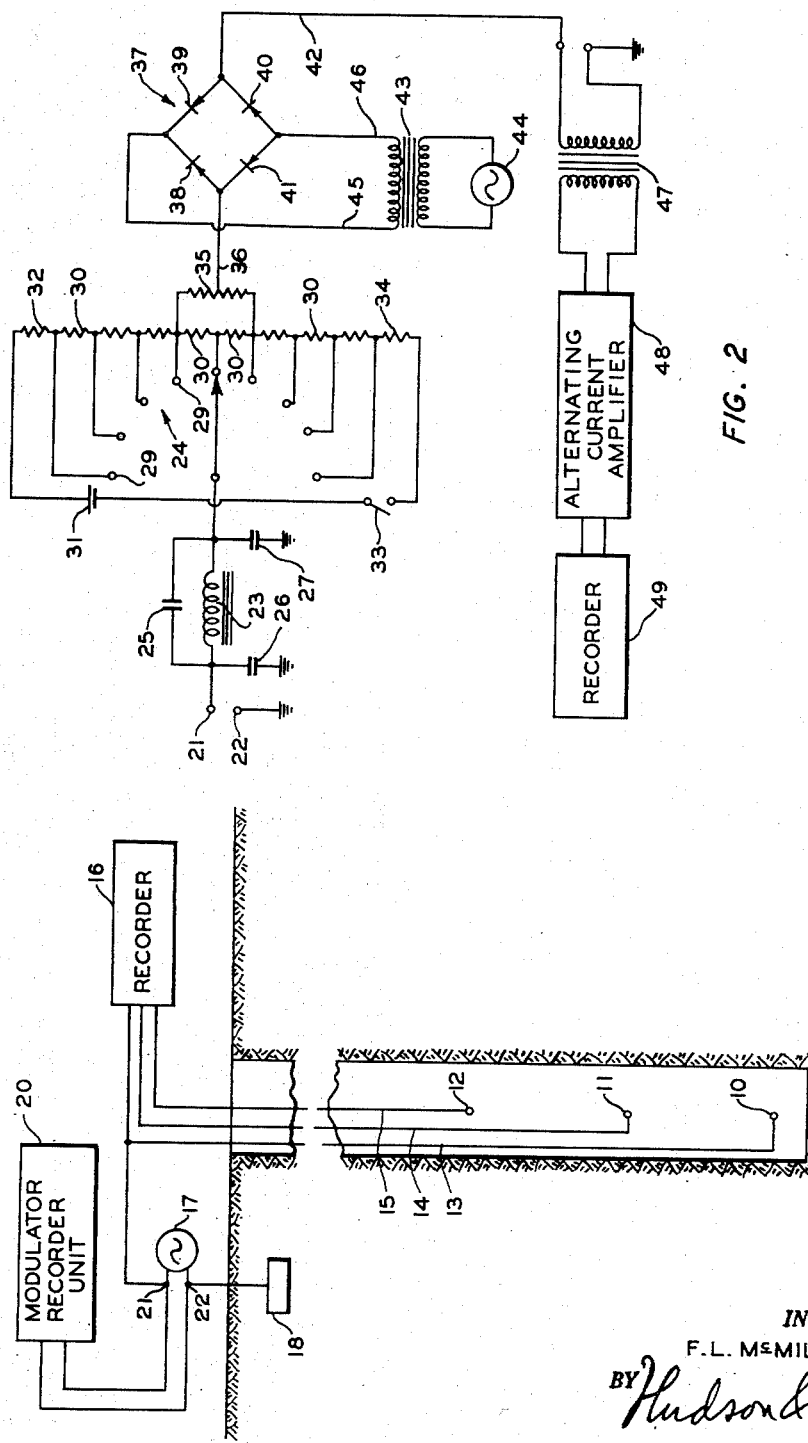
Sept. 14, 1954 F. L. McMILLAN, JR 2,689,336
DIRECT CURRENT VOLTAGE MEASURING MEANS, INCLUDING
BRIDGE-TYPE MODULATOR
Filed Dec. 16, 1949
INVENTOR.
F. L. McMILLAN, JR.
BY Hudson & Young
ATTORNEYS Patented Sept. 14, 1954

UNITED STATES PATENT OFFICE 2,689,336

DIRECT CURRENT VOLTAGE MEASURING MEANS, INCLUDING BRIDGE-TYPE MODULATOR

Fred L. McMillan, Jr., Bartlesville, Okla., assignor to Phillips Petroleum Company, a corporation of Delaware Application December 16, 1949, Serial No. 133,247

4 Claims. (Cl. 324—118)

1

This invention relates to well logging. In another aspect, it relates to a modulator circuit for use in well logging to permit alternating current amplification of low level direct current signals, such as those resulting from self-potential or spontaneous potential in formations adjoining a drill hole.

When an electrode is inserted into a well or drill hole, a potential is set up between this electrode and ground which is useful in providing an indication of the character of the formations traversed by the electrode. Such spontaneous potentials are of very small magnitude and appear as fluctuating direct voltages. Heretofore, the measurement of spontaneous potentials has required the use of direct current amplifiers, the characteristics of which are inferior to those of alternating current amplifiers. In addition, direct current amplifiers are comparatively expensive and difficult to adjust and operate.

It is an object of this invention to provide apparatus for measuring spontaneous potentials which permits alternating current amplification of the direct current signals.

It is a further object to provide a modulator circuit in which alternating currents are modulated by direct current signals representative of spontaneous potential so that the modulated signal may be fed to an alternating current amplifier.

It is a still further object to provide such apparatus which is of simple circuit construction, reliable in operation, rugged, durable, and which may be formed from a minimum number of standard circuit components.

Various other objects, advantages and features of the invention will become apparent from the following detailed description taken in conjunction with the accompanying drawings, in which:

Figure 1 is a schematic diagram of the logging circuit; and

Figure 2 is a detailed circuit diagram of the modulator-recorder unit of Figure 1.

Referring now to Figure 1, a plurality of electrodes 10, 11 and 12 are supported in a well or drill hole in any suitable manner and connected to surface apparatus by conductors 13, 14 and 15, respectively. It will be understood that the electrodes may be mounted upon a tool of well known construction which is suspended by a cable in the drill hole, the cable incorporating the conductors 13, 14 and 15. These conductors are connected to a recorder 16 and an alternating current source 17 is connected between conductor 13 and a ground plate 18 in the usual manner with the result that an alternating voltage appears between electrode 10 and ground, this voltage establishing a logging potential at the electrodes 11, 12 which is recorded and utilized to provide valuable information concerning the character of the formations traversed by the electrode assembly. Those skilled in the art will recognize that the system thus far described may be utilized to make either two electrode or three electrode logs of the drill hole.

Superimposed upon the alternating voltage produced by current source 17 at each of the electrodes 10, 11 and 12 is a direct voltage representative of the self-potential or spontaneous potential at the positions occupied by the respective electrodes. In accordance with the invention, the spontaneous potential at any desired one of the electrodes 10, 11 and 12, taken with respect to ground, is separated from the described alternating voltages and fed to a modulator-recorder unit 20 which provides a permanent record of the spontaneous potential, preferably upon the same recording medium or chart as that utilized to record the alternating voltages appearing at the respective electrodes.

The detailed circuit of the unit 20 is shown in Figure 2 and includes a set of input terminals 21, 22, the terminal 22 being grounded and terminal 21 being connected through an inductance 23 to the arm of a multi-position switch 24. The inductance 23 is shunted by a condenser 25, and the respective terminals of the inductance 23 are connected to ground through filter condensers 26 and 27. The inductance 23 together with the condensers 25, 26 and 27 constitutes an alternating current filter which excludes alternating voltages of the frequency generated by current source 17. Thus, the filter eliminates the alternating component of the voltage input fed to terminals 21, 22 but permits the direct voltage representative of spontaneous potential to pass with little or no attenuation.

The switch 24 has a plurality of stationary terminals 29 and each adjacent pair of terminals 29 has a fixed resistance 30 connected thereacross. A battery 31 has one terminal thereof connected through a fixed resistance 32 to one end terminal of switch 24, the other terminal of the battery being connected through a switch 33 and a fixed resistance 34 to the other end terminal of the switch. The two central resistances 30 are shunted by a fixed resistor 35, a center tap of which is connected by a lead 36 to a modulator circuit 37. The switch 24 together with its associated battery and fixed resistances enables the level of the signal appearing between conductor 36 and ground to be varied, as desired, in order to vary the position of the final trace upon the recording medium, as will be explained more fully hereinafter.

Modulator circuit 37 includes a bridge arrangement of four rectifiers 38, 39, 40 and 41, the lead 36 being connected to the junction between rectifiers 38, 41 and an outlet lead 42 being connected to the junction between rectifiers 39, 40. Rectifiers 38, 39, 40 and 41 are connected with their polarities as illustrated. Rectifiers 40 and 39 define a first unidirectional current path and rectifiers 41 and 38 define a second unidirectional current path. When a potential of first polarity is applied across the junctions between rectifiers 40, 41 and 38, 39 a first current path is provided through rectifiers 40 and 39 and a second current path is provided through rectifiers 41 and 38. When the potential applied across these terminals is of opposite polarity there is no current flow through the rectifiers.

In accordance with the invention, an alternating carrier voltage is applied to the bridge circuit from the secondary winding of a transformer 43, the primary winding of which is fed by a generator or other alternating current source 44. To this end, a lead 45 connects one terminal of the secondary winding to the junction between rectifiers 39, 38 while a lead 46 connects the other terminal of the secondary winding to the junction between the rectifiers 40 and 41. Assuming that the rectifiers are all of the polarity indicated, the spontaneous potential appearing between conductor 36 and ground modulates the alternating voltage appearing between conductors 45, 46, the resultant output voltage appearing between conductor 42 and ground. That is, the alternating current carrier voltage is modulated by the spontaneous potential in a manner analogous to the modulation of a radio frequency carrier wave by an audio signal voltage, this modulation being more fully explained as follows. In the absence of any difference in potential between conductors 36 and 42, alternating current will flow through the bridge circuit of modulator 37 only during those half cycles when conductor 46 is positive, said current path being from the secondary winding of transformer 43 through conductor 46, through the parallel paths comprising rectifiers 39 and 40 in one path and rectifiers 38 and 41 in the other, and back to the secondary winding of transformer 43 through conductor 45. On the following half cycles conductor 46 is negative resulting in no current flow through the bridge circuit of modulator 37. Now assuming that there is a difference in potential between conductors 36 and 42, said difference in potential being due to the spontaneous potential appearing on electrode 10, then during those half cycles when conductor 46 is positive, the difference in potential between conductor 36 and 42 will cause a portion of the alternating signal from transformer 43 to flow through the grounded primary of transformer 47 which is in circuit with conductors 36 and 42. As the spontaneous potential of electrode 10 increases and decreases a pulsing alternating current signal (from generator 44) will flow through the primary winding of transformer 47, the amplitude of said signal varying as a function of the modulating signal from electrode 10. The secondary winding of transformer 47 is connected to the input circuits of an alternating current amplifier 48 which, in turn, feeds a recorder 49. After amplification, of course, the signal may be demodulated in any suitable manner, either in the amplifier output circuits or in the recorder with the result that the trace produced by the recorder accurately reflects the spontaneous potential existing within the drill hole. The described modulating circuit permits an alternating current amplifier to be utilized with resultant saving in cost, efficiency of operation, and ease of adjustment.

Summarizing briefly the overall operation of the circuit, it will be noted that a spontaneous potential appearing at electrode 10 with respect to ground is fed to the unit 20 wherein the alternating components produced by generator 17 are removed by filter 23, 25, 26 and 27. A steady direct voltage is then added to the signal by battery 31, the magnitude of the added voltage being determined by the position of switch 24. As will be understood, this changes the ultimate level of the amplifier signal appearing at recorder 49 and, hence, the lateral position of the trace appearing upon the recorder chart. Thus, the lateral position of the recorder trace may be varied, as desired, by adjusting switch 24 to vary the steady direct voltage added to the signal representative of spontaneous potential. In the modulator 37, the signal representative of spontaneous potential modulates an alternating carrier wave produced by generator 44 and fed to the rectifier bridge circuit by transformer 43. As a result, alternating current amplifier 48 may be utilized to increase the amplitude of the extremely low level signals appearing at conductor 42 in an efficient manner. The amplifier output, after demodulation, produces a trace at the recorder 49 which is accurately representative of the spontaneous potential. It will be apparent, therefore, that I have achieved the objects of my invention in providing a logging circuit wherein the low level signals representative of spontaneous potential are amplified in an efficient manner by the use of a modulator circuit of novel construction.

As those skilled in the art will understand, the spontaneous potential may be picked up from the electrode 11 or 12, rather than from the electrode 10. Moreover, it will be evident that the invention is applicable to a logging circuit utilizing any desired number of electrodes and is not restricted to the three electrode system illustrated and described. Finally, in some cases, the filter for separating the spontaneous potential from the alternating current signals produced by generator 17, Figure 1, is not required where a log is made solely of spontaneous potentials for, in this event, no extraneous voltages would appear across the the formation requiring separation from the spontaneous potential.

While the invention has been described in connection with a present, preferred embodiment thereof, it is to be understood that this description is illustrative only and is not intended to limit the invention, the scope of which is defined by the appended claims.

I claim:

1. A modulator-recorder unit for use in electrical well logging which comprises, in combination, a source of direct current signal voltage, a filter for excluding signals of a predetermined frequency range from said signal voltage, a variable resistance unit, a battery connected across said unit, a lead connecting the output of said filter to preselected portions of said unit, means for withdrawing an output voltage from a second preselected portion of said unit, a rectifier bridge network, means for supplying an alternating carrier voltage to two opposite terminals of said bridge, an alternating current amplifier, and means connecting the input circuit of said amplifier in series with said second portion of said variable resistance unit and the other opposite terminals of said bridge.

2. A modulator-recorder unit for use in electrical well logging which comprises, in combination, a source of direct current signal voltage, a filter including an inductance, a condenser in shunt therewith, and condensers connected between the respective terminals of said inductance and ground to exclude voltages within a predetermined frequency range from the signal voltage, a variable resistance unit, a battery connected across said unit, a lead connecting the output of said filter to preselected portions of said unit, means for withdrawing an output voltage from a second preselected portion of said unit, a rectifier bridge network, means for supplying an alternating carrier voltage to two opposite terminals of said bridge, an alternating current amplifier, and means connecting the input circuit of said amplifier in series with said second portion of the resistance unit and the other opposite terminals of said bridge.

3. A modulator circuit comprising, in combination, a bridge network including two parallel unidirectional current flow paths, each of said paths including two series-connected rectifiers, means for applying an alternating carrier voltage to the two opposite terminals of said bridge defining said two parallel flow paths, a source of direct current signal voltage, a filter connected in circuit with said direct current signal voltage to exclude any signals of a predetermined frequency range, a voltage dividing network having a bias potential applied thereacross, said voltage dividing network being connected in circuit with said direct current signal voltage and said filter, an alternating current amplifier, and means connecting the input circuit of said amplifier in circuit with said source of direct current signal voltage, said filter, said voltage dividing network, and the other opposite terminals of said bridge, said other terminals being the junctions between the series-connected rectifiers.

4. A circuit adapted to measure fluctuating direct voltages comprising, in combination, a bridge network including two parallel unidirectional current flow paths, each of said paths including two series-connected rectifiers, means for applying an alternating carrier voltage to the two opposite terminals of said bridge defining said two parallel flow paths, a source of direct signal voltage to be measured, an alternating current amplifier, means connecting the input circuit of said amplifier in series with said source of direct voltage and the other pair of opposite terminals of said bridge, said other pair of terminals being the junctions between the series-connected rectifiers, and a meter connected to the output of said amplifier to measure the output amplified alternating signal therefrom, the amplitude of said alternating amplified signal being proportional to the amplitude of said direct signal voltage.

References Cited in the file of this patent

UNITED STATES PATENTS

| Number | Name | Date |
|---|---|---|
| 2,148,718 | Agins | Feb. 28, 1939 |
| 2,188,830 | Clark et al. | Jan. 30, 1940 |
| 2,326,465 | Keeler | Aug. 10, 1943 |
| 2,415,364 | Mounce | Feb. 4, 1947 |
| 2,436,563 | Frosch | Feb. 24, 1948 |
| 2,459,104 | Gilbert | Jan. 11, 1949 |
| 2,501,953 | Martin | Mar. 28, 1950 |
| 2,620,380 | Baldwin | Dec. 2, 1952 |